(12) United States Patent
Dobbin et al.

(10) Patent No.: US 9,400,007 B2
(45) Date of Patent: Jul. 26, 2016

(54) INJECTABLE NUT CAP

(71) Applicant: AIRBUS OPERATIONS LIMITED, Bristol (GB)

(72) Inventors: Richard Dobbin, Chepstow (GB); Guy Tothill, Bristol (GB); David Liversage, Branston (GB); Darren Crew, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/404,263

(22) PCT Filed: May 17, 2013

(86) PCT No.: PCT/GB2013/051274
§ 371 (c)(1),
(2) Date: Nov. 26, 2014

(87) PCT Pub. No.: WO2013/178985
PCT Pub. Date: Dec. 5, 2013

(65) Prior Publication Data
US 2015/0184688 A1 Jul. 2, 2015

(30) Foreign Application Priority Data

May 31, 2012 (GB) .................................. 1209724.2
Apr. 19, 2013 (GB) .................................. 1307134.5

(51) Int. Cl.
*A47G 3/00* (2006.01)
*F16B 39/02* (2006.01)
(Continued)

(52) U.S. Cl.
CPC .............. *F16B 39/021* (2013.01); *B64D 45/02* (2013.01); *F16B 37/14* (2013.01); *F16B 11/006* (2013.01); *F16B 33/004* (2013.01); *Y10T 29/49993* (2015.01)

(58) Field of Classification Search
CPC ...... F16B 11/006; F16B 33/004; F16B 37/14; F16B 39/021; F16B 39/02; A47G 3/00

USPC ............ 411/82, 82.3, 103, 172, 372.5–372.6, 411/373, 377
See application file for complete search history.

(56) References Cited

U.S. PATENT DOCUMENTS 1,805,937 A * 5/1931 Berge ...................... A47G 3/00
24/113 MP
2,710,113 A   6/1955 Pritchard
(Continued)

FOREIGN PATENT DOCUMENTS

DE     102005030817 A1   1/2007
EP         0334011 A1    9/1989
(Continued)

OTHER PUBLICATIONS

International Search Report mailed Aug. 28, 2013 in International Application No. PCT/GB2013/051274, filed May 17, 2013.
(Continued)

*Primary Examiner* — Roberta Delisle
(74) *Attorney, Agent, or Firm* — Hauptman Ham, LLP

(57) ABSTRACT

The present invention proposes a cap for forming a sealed cavity around one end of a fastener to thereby contain outgassing and sparking events in the event of a lightning strike to the fastener. The invention also proposes a joint comprising such a cap, and a kit of parts and method for installing such a cap. A cap according to the invention comprises: an inner cap member having an annular base terminating at an edge which surrounds an opening into an air cavity for enclosing the one end of a fastener; and an outer cap member having an annular skirt or flange which extends radially outwardly away from the annular base, the annular skirt or flange and annular base between them defining an annular sealing cavity. The cap also comprises a sealing material inlet comprising an opening in the outer cap member that is in fluid communication with the annular sealing cavity, the opening being arranged to interconnect with a sealing material injection device to provide a flow of curable sealing material from the sealing material inlet into the annular sealing cavity.

26 Claims, 11 Drawing Sheets

(51) Int. Cl.
*B64D 45/02* (2006.01)
*F16B 37/14* (2006.01)
*F16B 11/00* (2006.01)
*F16B 33/00* (2006.01)

(56) References Cited

U.S. PATENT DOCUMENTS

| | | | | |
|---|---|---|---|---|
| 3,557,654 | A * | 1/1971 | Weidner, Jr. | F16B 33/004 411/377 |
| 4,129,060 | A * | 12/1978 | Gould | F16B 37/14 411/372.5 |
| 4,400,123 | A * | 8/1983 | Dunegan | F16B 37/14 116/270 |
| 4,826,380 | A * | 5/1989 | Henry | B64D 45/02 156/229 |
| 5,419,666 | A | 5/1995 | Best | |
| 6,135,691 | A * | 10/2000 | Nadarajah | F16B 37/14 411/372.6 |
| 2012/0074257 | A1 | 3/2012 | Bessho et al. | |
| 2012/0219380 | A1 | 8/2012 | Hutter, III | |

FOREIGN PATENT DOCUMENTS

| | | |
|---|---|---|
| FR | 2626629 A1 | 8/1989 |
| JP | H02-007398 A | 1/1990 |
| JP | H01-143417 | 8/1991 |
| JP | H02-102910 A | 1/1992 |
| WO | 2012/107741 A1 | 8/2012 |
| WO | 2012/118855 A2 | 9/2012 |

OTHER PUBLICATIONS

Written Opinion mailed Aug. 28, 2013 in International Application No. PCT/GB2013/051274, filed May 17, 2013.
UKIPO Search Report dated Sep. 13, 2012 in GB Application No. 1209724.
JP Office Action dated Mar. 15, 2016, Japanese Application No. 2015-514575.

* cited by examiner

INJECTABLE NUT CAP

RELATED APPLICATIONS

The present application is a National Phase of International Application Number PCT/GB2013/051274, filed May 17, 2013, and claims priority from Great Britain Application No. 1209724.2, filed May 31, 2012 and Great Britain Application No. 1307134.5, filed Apr. 19, 2013.

FIELD OF THE INVENTION

The present invention relates to a cap for forming a sealed cavity around one end of a fastener, a joint comprising such a cap, and a kit of parts and method for installing such a cap.

BACKGROUND OF THE INVENTION

FIG. 1 is a side view of part of a fastener assembly passing through a panel 1, which may be a composite or metallic panel. The assembly comprises a fastener comprising an externally threaded bolt 2, an internally threaded nut 3, and a washer 4 (the fastener may alternatively comprise any other known fastener type, such as a rivet or swage fastener). In the event of a lightning strike hitting the panel 1 and attaching to the fastener, sparking, plasma or out-gassing may occur at the locations indicated by reference 5 in FIG. 1.

A known method of providing spark suppression is described in EP-A-0334011. A volume of gas is enclosed by a cap around the fastener. The gas provides spark suppression for arcing that may occur between the composite structure and the metal fastener during any lightning strike.

SUMMARY OF THE INVENTION

A first aspect of the invention provides a cap for forming a sealed cavity around one end of a fastener, the cap comprising: an inner cap member having an annular base terminating at an edge which surrounds an opening into an air cavity for enclosing the one end of a fastener; an outer cap member having an annular skirt or flange which extends radially outwardly away from the annular base, the annular skirt or flange and annular base between them defining an annular sealing cavity; and a sealing material inlet comprising an opening in the outer cap member that is in fluid communication with the annular sealing cavity, the opening being arranged to interconnect with a sealing material injection device to provide a flow of curable sealing material from the sealing material inlet into the annular sealing cavity.

Since the sealing material can be injected after positioning of the cap onto an end of a fastener it is possible to use sealing materials with short handling and curing times. The sealing material can be mixed in the sealing material injection device on application, thus ensuring that the material is applied during its working life and before it has started to cure. Quick cure sealing materials have the advantage of providing a stable bond very quickly. That is, the installed cap will be able to withstand accidental knocks or similar from assembly workers within a short timeframe.

The annular sealing cavity provides a large contact area for the seal which in turn provides a strong, reliable bond between the cap and structure in a relatively small footprint area. A good seal between the cap and structure is essential, both to maintain a sealed volume of air within the air cavity so that the air cavity can safely contain out-gassing and sparking caused during a lightning strike, and to prevent leakage of fuel into the air cavity.

The cap of the present invention also prevents air gaps within the cured seal, and provides for a clean and consistent application process. It is particularly important to prevent air gaps in the sealing material since such air gaps compromise the seal (bond line) and thereby permit fuel leakage into the air cavity.

Sealing material within the annular sealing cavity has a primary function of sealing the air cavity when the nut cap is installed over a fastener passing through a structure, but may also have a function of bonding the cap to the structure. Thus, the sealing material may comprise a sealing and bonding material. Similarly, the annular sealing cavity may comprise an annular sealing and bonding cavity.

The cap may comprise an interfay cavity in fluid communication with the opening of the sealing material inlet and the annular sealing cavity. During assembly the interfay cavity carries a flow of curable sealing material from the sealing material inlet into the annular sealing cavity. After the injected sealing material has cured within the interfay cavity it serves to bond the inner cap member to the outer cap member. This bond provides the cap with additional strength, flexibility and shock resistance, and increased resistance to fuel ingress.

The opening of the sealing material inlet is preferably centred on a central axis of the outer cap member. Such a central position ensures an even flow to the whole circumference of the annular sealing cavity. Alternatively, the opening may be offset from the central axis in some embodiments in order to enable installation of the cap in confined spaces. It may be necessary in such cases to incorporate additional restriction features or other features into the cap to ensure that the flow of sealant material is able to provide an even seal (bond line).

The interfay cavity may comprise a flow restriction feature arranged to restrict flow of curable sealing material from the opening to the annular sealing cavity. Such a flow restriction feature may comprise a region of reduced cross-sectional area of the interfay cavity. The flow restriction feature serves to prevent flow of sealing material into the annular sealing cavity until the whole interfay cavity is filled with sealing material. Once filled, the pressure within the sealing material increases sufficiently to overcome the resistance provided by the flow restriction feature, and thereby permit an even delivery of sealing material to the whole circumference of the annular sealing cavity.

The cap may further comprise a reservoir arranged to receive curable sealing material from the opening and distribute it to the annular sealing cavity. The reservoir may comprise an open-topped chamber axially aligned with (i.e. positioned directly beneath) the opening. Once filled with sealing material, the reservoir may be arranged to overflow via a peripheral edge (i.e. upper edge) to provide a uniform flow of sealing material in all radial directions.

The interfay cavity may have an annular cross-sectional shape. Thus, there is uniform flow of sealing material around the whole circumference of the interfay cavity, and a corresponding uniform flow into the annular sealing cavity.

The inner cap member preferably comprises a substantially dome-shaped portion extending from the annular base, and the outer cap member preferably comprises a corresponding substantially dome-shaped portion extending from the annular skirt or flange. The dome shape of the outer cap member reduces the likelihood of damage to the cap e.g. by accidental knocking by an assembly worker, and minimises stress concentrations. The dome shape of the inner cap member enables the volume of the air cavity to be minimised, and therefore minimises the overall size and mass of the cap. The dome shape thus maximises the air cavity volume for a given weight and space envelope. Where an interfay cavity is provided, then the interfay cavity thus comprises a thin-walled dome-shaped cavity defined between the dome-shaped portions of the inner and outer cap members. The dome shape of the interfay cavity provides a low resistance fluid flow path for injected sealing material.

The cap may comprise a plurality of channels formed in either an outer surface of the inner cap member or an inner surface of the outer cap member, each channel being in fluid communication with the opening of the sealing material inlet and the annular sealing cavity.

The channels may be shallow channels which extend over only part of the gap between the inner and outer cap members—the rest of the gap providing a continuous interfay region. More preferably either: the channels are formed in the outer surface of the inner cap member and separated by ridges which abut the inner surface of the outer cap member; or the channels are formed in the inner surface of the outer cap member and separated by ridges which abut the outer surface of the outer cap member. Thus in this case the ridges divide the gap between the inner and outer cap members into a plurality of channels and do not permit the sealing material to flow between the channels. The ridges may be joined to the other cap member where they abut that other cap member.

Typically each channel has a channel inlet arranged to receive the flow of curable sealing material from the sealing material inlet and an outlet arranged to feed the flow of curable sealing material into the annular sealing cavity. The channels may run all the way to the edge of the annular base of the inner cap member, but more preferably the outlets of the channels are set back in an axial direction from the edge of the annular base of the inner cap member.

The inner cap member may comprise a shoulder joining the annular base to a smaller diameter outboard portion, and the outlets of the channels may be set back in the axial direction from the shoulder or adjacent to the shoulder.

The inner or outer cap member may be formed with channels on one side only, but more preferably the inner or outer cap member has a corrugated shape. That is, either: the channels are formed in an outer surface of the inner cap member and a plurality of corresponding channels are formed in an inner surface of the inner cap member; or the channels are formed in an inner surface of the outer cap member and a corresponding plurality of channels are formed in an outer surface of the outer cap member. Forming the inner or outer cap member with such a corrugated shape enables relatively narrow channels to be formed without resulting in a large amount of extra weight.

The inner or outer cap member typically has side walls forming the channels with a substantially uniform wall thickness. This minimises the weight of the cap.

Each channel may have a width which increases as it extends towards the annular sealing cavity. This encourages the separate streams of sealing material from the different channels to merge as they exit the channels.

Each channel may have a depth which decreases as it extends towards the annular sealing cavity.

Preferably, the annular skirt or flange of the outer cap member terminates at an edge, the edge of the annular skirt or flange being offset in an axial direction from the edge of the annular base of the inner cap member. That is, when the cap is in place with the end of the fastener enclosed within the air cavity and the edge of the inner cap member abutting the structure through which the fastener passes, there will usually be a gap between the edge of the annular skirt or flange and the structure. This gap enables sealing material to flow out from the annular sealing cavity so that it forms a visible ring around the cap, thus providing a visual indication of a complete and uniform seal. The offset edge also enables the cap to be fitted to structures which have a raised region such as a fillet radius or step close to the edge of the inner cap member.

The inner cap member and outer cap member are preferably formed as separate parts, cured sealant in the interfay cavity after assembly optionally bonding one to the other. By forming the two members as separate parts the manufacturing process is considerably simplified. The inner and outer cap members may be formed by injection moulding, preferably from a thermoplastic material such as a glass-filled polyetherimide (PEI). A suitable glass-filled PEI is Ultem™ 2400, which includes 40% glass fibres by volume. The two parts may be correspondingly shaped such that when assembled together there is an interference fit between them that prevents inadvertent disassembly and provides a gripping force to hold the cap on the fastener during curing of the sealing material. Alternatively the two parts may be joined together (for example by welding) before the sealing material is introduced. Alternatively the two cap members may be formed together as one integral part, for example by additive layer manufacturing.

Optionally the outer cap member is transparent in order to observe the sealing material as it is injected.

The annular sealing cavity may have a generally flared shape such that its cross-sectional area decreases with distance from the edge of the annular base. Thus, the area of sealing material in contact with the structure to which the cap is to be bonded can be maximised without increasing the overall diameter of the cap. The annular skirt or flange thus preferably extends radially outwardly from the annular base at an acute angle to the annular base. Alternatively the annular skirt or flange may extend radially outwardly from the annular base at a right angle to the annular base.

The annular skirt or flange may extend radially outwardly from the annular base along its full length. Alternatively the annular skirt or flange may comprise a cylindrical portion which extends parallel with the annular base, and a shoulder which extends radially outwardly from the annular base and joins the cylindrical portion to an outboard portion of the outer cap member (which may be domed). The shoulder may extend radially outwardly from the annular base at an acute angle to the annular base, or at a right angle to the annular base.

The sealing material inlet may comprise a projection (such as a boss) in the outer cap member, the projection containing the opening and being arranged to interconnect with the sealing material injection device.

The annular parts of the cap (that is, the annular base, the annular skirt or flange, and the annular sealing cavity) may have a generally circular shape in cross-section, or they may be any other closed shape in cross-section such as hexagonal or square (for instance to enclose a fastener with a hexagonal or square shape).

A second aspect of the present invention provides a joint comprising: a structure; a fastener passing through the structure; a cap according to the first aspect, wherein the air cavity of the inner cap member encloses an end of the fastener and the edge of the inner cap member abuts the structure; and sealing material filling the annular sealing cavity of the cap and contacting the structure to seal the air cavity.

The sealing material within the annular sealing cavity thus serves to maximise the seal (bond) thickness and the leak path length between the outside of the seal (bond) and the air cavity (inner cavity).

In preferred embodiments the sealing material (or sealing and bonding material) fills the annular sealing cavity to also bond the cap to the structure. The bond between the cap and the structure is thus formed by the cap-sealant material bond and the sealant material-structure bond.

A cap according to the first aspect may enclose each end of the fastener, so that the joint is sealed from both sides of the structure.

The structure is preferably a structural component of an aircraft, more preferably a structural component of an aircraft wing, and most preferably a structural component of an aircraft wing which forms a boundary wall of a fuel tank. The structure preferably comprises a composite structural component, and the fastener may be a metal fastener. In such cases a lightning strike may be particularly likely to occur at the fastener. The structure typically comprises a pair of structural parts which are joined together by the fastener. In such aircraft applications the air cavity of the cap provides an air pocket within which controlled out-gassing or sparking events can safely occur in the event of a lightning strike. The sealing material also provides a fluid tight seal around the end of the fastener, thus preventing fuel leakage through the hole in the structure through which the fastener passes.

The sealing material preferably comprises an epoxy based adhesive, most preferably a two-part epoxy based structural adhesive such as Scotch-Weld™ 7256 B/A, produced by 3M™. Such epoxy based materials are normally used in applications in which its primary (or sole) purpose is to act as an adhesive, but in the present invention it acts as both an adhesive and a sealant. Such two-part adhesives are typically supplied in cartridge form (50 ml cartridges being preferred) and are mixed within the nozzle of an injector gun on application. Epoxy based adhesives are free-flowing, have a low viscosity, and exhibit rapid cure at room temperature. By mixing the two-part adhesive on application it is possible to use adhesives with very low working lives, for example a working life of only a few minutes. Such adhesives could not be used with known sealing caps, which require application before assembly of the cap over the fastener end and/or by hand.

A suitable alternative material for the sealing material is a sealant material such as a two-part polysulphide based sealant or silicone based sealant. The sealing material is thus typically an elastomer. A suitable polysulphide based sealant is MC-238 Class A/B, produced by Chemetall™. Two-part sealants can be supplied within a cartridge for application via an applicator gun, and are typically mixed within the cartridge before delivery via the nozzle of the gun. Such sealants typically have a much longer cure time than two-part adhesives. In particular, the time taken to achieve a robust seal capable of withstanding accidental knocks etc may be 12 hours or more, compared to approximately 1 hour for an epoxy adhesive.

The inner cap member may or may not abut the fastener. If it abuts the fastener then it may abut the fastener via a plurality of ribs projecting from an inner surface of the inner cap member.

The fastener may project from the structure or it may be countersunk within the structure.

A third aspect of the invention provides a kit of parts for forming a sealed cavity around one end of a fastener, the kit including:

a cap comprising: an inner cap member having an annular base terminating at an edge which surrounds an opening into an air cavity for enclosing the one end of a fastener; an outer cap member having an annular skirt or flange which extends radially outwardly away from the annular base, the annular skirt or flange and annular base between them defining an annular sealing cavity; and a sealing material inlet in fluid communication with the annular sealing cavity; and a sealing material injection device having a nozzle arranged to interconnect with the sealing material inlet of the cap to direct a flow of curable sealing material into the annular sealing cavity.

By providing the cap separately from the curable sealing material, the sealing material can be a quick cure sealing material of the type which has a short working life, since it is applied directly to the assembled cap, optionally via a static mixing nozzle. The kit of parts can be used to form the joint of the second aspect, and thereby achieve the associated benefits. The cap may comprise a cap according to the first aspect.

The injection device may be powered manually, electrically, or by compressed air. The injection device may be arranged to deliver a fixed volume of sealing material to thereby ensure a controlled and consistent application process.

The curable sealing material may be a two-part adhesive or sealant material, the two parts of which are mixed together in the nozzle of the injection device before injection into the cap. Alternatively, the two parts may be pre-mixed before delivery via the nozzle of the injection device. The curable sealing material preferably comprises an epoxy based adhesive that has good flow characteristics, most preferably a two-part epoxy based adhesive such as Scotch-Weld™ 7256 B/A, produced by 3M™. Such two-part adhesives are supplied in the form of cartridges (50 ml cartridges, or larger cartridges, being preferred) which can be loaded into the injection device. The two parts of the adhesive are mixed within the nozzle of the injector gun on application.

Epoxy based adhesives are free-flowing, have a low viscosity, and exhibit rapid cure at room temperature. By mixing the two-part adhesive on application it is possible to use adhesives with very short working lives, for example a working life of only a few minutes. Such adhesives could not be used with known sealing caps, which require application before assembly of the cap over the fastener end and/or by hand.

A suitable alternative material for the sealing material is a sealant material such as a two-part polysulphide based sealant or manganese dioxide based sealant. A suitable polysulphide based sealant is MC-238 Class A/B, produced by Naftoseal™. Two-part sealants can be mixed within an applicator gun before delivery, as discussed above, but typically have a much longer cure time than two-part adhesives. In particular, the time taken to achieve a robust seal capable of withstanding accidental knocks etc may be 12 hours or more, compared to approximately 1 hour for an epoxy adhesive.

A fourth aspect of the invention provides a method of installing a cap to form a sealed cavity around one end of a fastener passing through a structure, the cap comprising: an inner cap member having an annular base terminating at an edge which surrounds an opening into an air cavity for enclosing the one end of a fastener; an outer cap member having an annular skirt or flange which extends radially outwardly away from the annular base, the annular skirt or flange and annular base between them defining an annular sealing cavity; and a sealing material inlet comprising an opening in the outer cap member that is in fluid communication with the annular sealing cavity, the method including:

installing the cap over the one end of the fastener so that it is enclosed within the air cavity of the inner cap member and the edge of the annular base abuts the structure;

injecting curable sealing material into the annular sealing cavity via the sealing material inlet so that the curable sealing material contacts the structure; and curing the curable sealing material to seal the air cavity.

The cured sealing material may thus form a continuous void-free seal (bond) around the air cavity.

The step of curing the curable sealing material may also include adhering the cap to the structure.

The cap may comprise a cap according to the first aspect, and the method may result in a joint according to the second aspect. The method may use a kit of parts according to the third aspect.

The structure preferably comprises a structural component of an aircraft, more preferably a structural component of an aircraft wing, and most preferably a structural component of an aircraft wing which forms a boundary wall of a fuel tank. The structure preferably comprises a composite structural component or a hybrid assembly of composite and metallic structural components, and the fastener comprises a metal fastener. In such cases a lightning strike may be particularly likely to occur at the fastener or in an area immediately surrounding the fastener. The structure typically comprises a pair of structural parts which are joined together by the fastener. In such aircraft applications the air cavity of the cap provides an air pocket which will safely contain out-gassing or sparking events that occur in the event of a lightning strike. The sealing material also provides a fluid tight seal around the end of the fastener, thus preventing fuel leakage into the inner air cavity.

The curable sealing material preferably comprises an epoxy based adhesive, as described above in relation to the third aspect.

Any of the optional, or desirable, features discussed above or below in relation to any of the aspects of the invention may be applied to any other aspect, either individually or in any combination.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
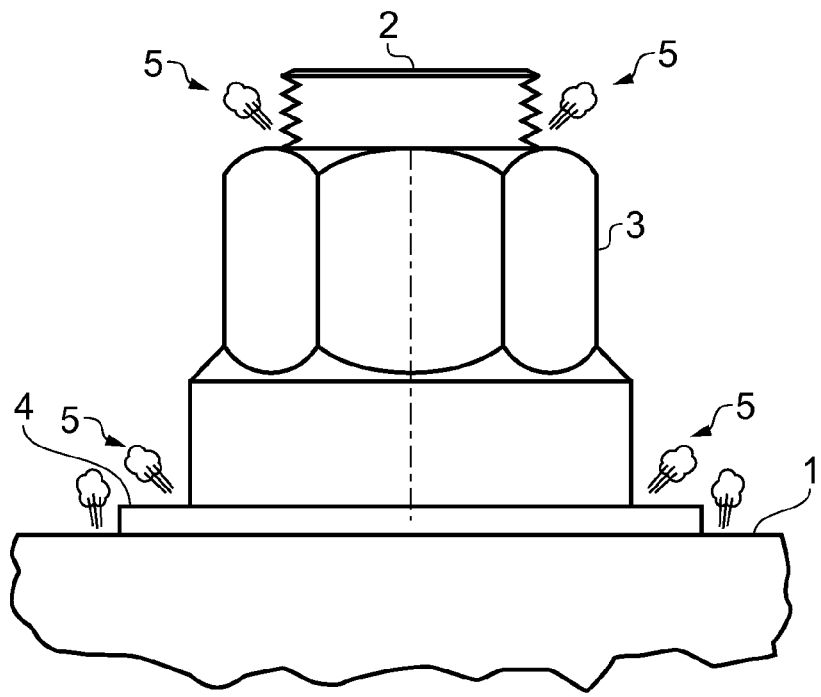
FIG. 1 is a side view of a prior art nut and bolt assembly.
Figure 2:
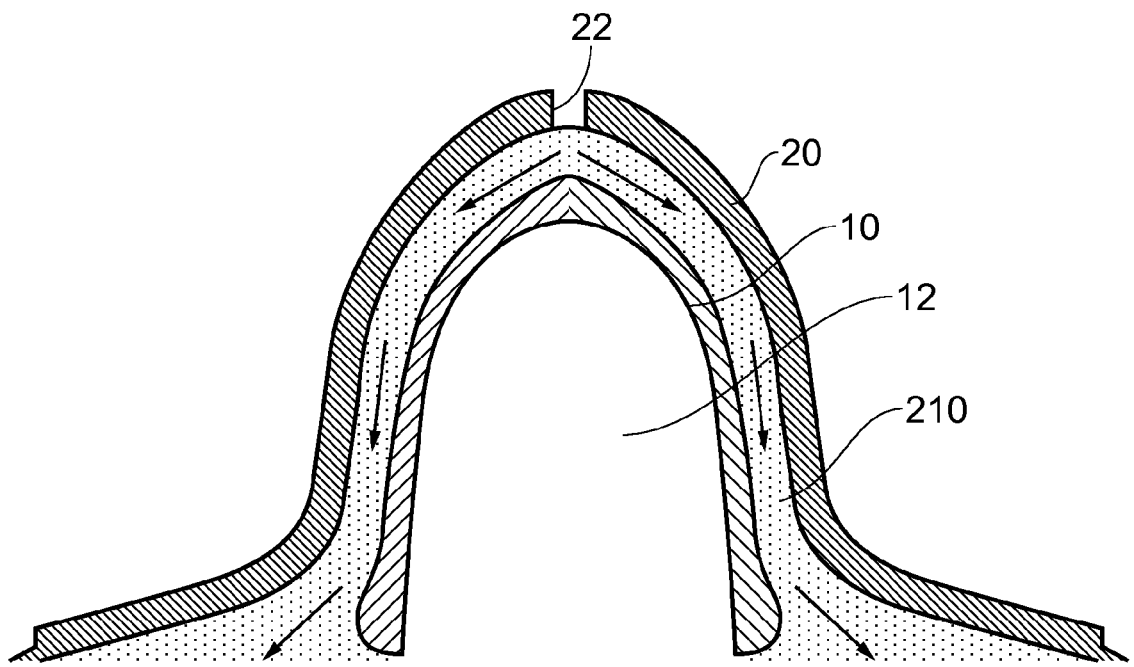
FIG. 2 is a cross-sectional view of a nut cap according to a first embodiment of the invention.
Figure 3:
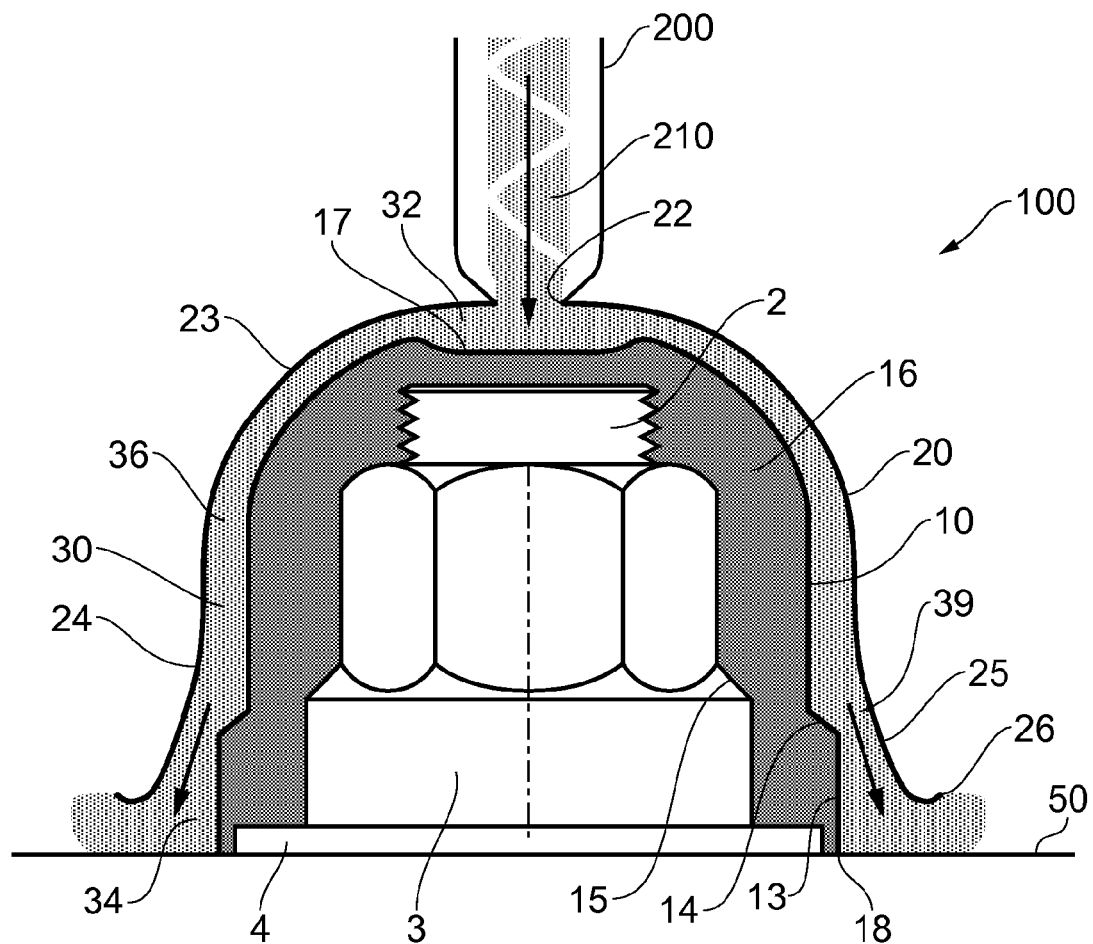
FIG. 3 is a cross-sectional view of a nut cap according to a second embodiment of the invention.

FIG. 2 shows a simplified embodiment of the present invention, while FIG. 3 shows a more detailed embodiment. Equivalent features of each embodiment are identified by the same reference numerals.

The injectable nut cap 100 of the present invention includes an inner cap member 10 and an outer cap member 20. The inner and outer cap members 10, 20 are injection moulded from a thermoplastic material such as glass-filled polyetherimide (PEI). A suitable glass-filled PEI is Ultem™ 2400, which includes 40% glass fibres by volume. The inner and outer cap members may alternatively be made by moulding, by an additive manufacturing process, or by any other suitable process.

The inner cap member 10 is a generally thin-walled dome-shaped member, with a correspondingly dome-shaped inner air cavity 12 which encloses the tail end of a fastener protruding from a structural element, which in this embodiment is a composite aircraft structural component 50, but may be a hybrid composite-metallic component. That is, the air cavity 12 encloses the part of a bolt 2 which protrudes from the structural element 50, and a nut 3 and washer 4 fastened to that bolt 2. The inner cap member 10 is generally made up of a base cylindrical portion 13, a shoulder 14 joining the base cylindrical portion 13 to a smaller diameter mid cylindrical portion 15, and an upper dome portion 16 which extends from the mid cylindrical portion 15 to a central recessed portion 17. In use, the exposed edge 18 of the base cylindrical portion 13 abuts the structural element 50 to fully encapsulate the tail end of the fastener 2, 3, 4 within the air cavity 12. The base cylindrical portion 15 has a diameter sized to fit snugly over the fastener 2, 3, 4 with an interference fit to hold the cap in place during injection and curing of sealing material (see below). In some embodiments (not shown) it may incorporate mechanical locking features for providing a mechanical connection between the inner cap member 10 and the fastener 2, 3, 4. For example, the washer 4 may incorporate an overhang portion which interconnects with a snap-fit mechanism of the base cylindrical portion 15.

The outer cap member 20 is also a generally thin-walled dome shaped member, and is shaped to fit over the inner cap member 10 so that there is a continuous sealing volume 30 between them. The outer cap member 20 is generally made up of a central dome portion 23 and a mid cylindrical portion 24 which connects the dome portion 23 to an annular flared skirt or flange portion 25 which has a raised lip 26 at its free edge. The outer cap member 20 has a central opening 22 in its central dome portion 23 which is sized to interconnect with the nozzle 200 of a sealing material injector gun, as shown in FIG. 3. The nozzle 200 delivers a continuous flow of sealing material 210 into the sealing volume 30 via the opening 22. In the present embodiment a two-part epoxy based structural adhesive such as Scotch-Weld™ 7256 B/A, produced by 3M™, is preferred. This adhesive is supplied in cartridge form (50 ml cartridges being preferred) and mixed within the nozzle 200 on application by the injector gun. Such epoxy based adhesives are free-flowing, have a low viscosity, and exhibit rapid cure at room temperature. A suitable alternative material is a two-part polysulphide based sealant such as MC-238 Class A/B, produced by Naftoseal™.

The sealing volume 30 between the inner and outer cap members 10, 20 has three key regions: a reservoir 32 (not shown in the embodiment of FIG. 2); an annular sealing volume 34; and an interfay volume 36 which interconnects the reservoir 32 and annular sealing volume 34. The reservoir 32, which is formed by the recessed portion 17 of the inner cap member 10, is directly below the opening 22 so that it receives sealing material 210 directly therefrom. The reservoir 32 serves to improve the flow of sealing material 210 into the sealing volume 30 by providing a relatively low flow resistance, and also serves to provide an even, uniform flow into the interfay volume 36. The interfay volume 36 comprises a generally thin-walled dome shaped volume through which sealing material 210 can flow from the reservoir 32 to the annular sealing volume 34 during assembly. The domed shape of the interfay volume 36 serves to aid this flow of sealing material 210 since it provides little flow resistance compared with, for example, a volume incorporating sharp changes of direction or sharp corners. Once cured, the sealing material 210 within the interfay volume 36 serves to bond the inner cap member 10 and outer cap member 20 together, and adds structural rigidity to the cap 100.

The annular sealing volume 34 is formed between the flared skirt or flange 25 of the outer cap member 20 and the lower portion of the inner cap member 10. The skirt or flange 25 extends radially outwardly away from the annular base 13 along its full length at a small acute angle, which increases at the lip 26. Thus, the annular sealing volume 34 has a generally flared shape such that its cross-sectional area increases with distance from the opening 22. The annular sealing volume 34 is open at its lower face such that the sealing material 210 can flow outwardly from the sealing volume 30 and into contact with the structural element 50. The flared shape of the annular sealing volume 34 provides a large adhesion area for the sealing material 210, which, once cured, acts to seal the cap 100 to the structural element 50. Moreover, this large adhesion area is achieved within a relatively small footprint on the structural element.

The raised lip 26 of the outer cap member 20 is axially offset from the base edge 18 of the inner cap member 10 in the embodiment of FIG. 3. This arrangement ensures that the outer cap member 20 does not clash with features of the structural element, such as ramps or radii (fillets), in the event that the fastener is located very close to such features. Such a potential clash is not uncommon in aircraft structures, where it is possible for the outer edge of a fastener to be located only 1.6 mm from the edge of a fillet with a 5 mm radius. It also ensures that the seal is able to accommodate small surface feature deviations in the structural element, and is sufficiently thick to have a degree of flexibility once cured.

The sealing volume 30 in the embodiment of FIG. 3 also includes a flow restriction region 39 which comprises a region of decreased cross-sectional area between the interfay volume 36 and the annular sealing volume 34. The flow restriction region 39 serves to provide a region in which there is increased resistance to flow of sealing material 210. This provides an even distribution of sealing material 210 around the annular sealing volume 34 because sealing material 210 becomes 'backed up' above the flow restriction region 39 until the whole interfay volume 36 is filled with sealing material 210. Once the interfay volume 36 is completely filled the pressure within that volume increases sufficiently to cause the sealing material to overcome the resistance and flow through the flow restriction region 39 into the annular sealing volume 34. This flow will thus be uniform around the circumference of the annular sealing volume 34.

The shape of the sealing volume 30 between the inner and outer cap members 10, 20 is maintained (at least before and during injection of the sealing material 210) by a plurality of vanes (not shown) extending radially inwardly from the inner face of the outer cap member 20 and spaced evenly around the circumference thereof. The vanes abut the outer face of the inner cap member 10 to ensure the outer cap member 20 is correctly located relative to the inner cap member 10. The vanes may control the relative radial position of the outer cap member 20 by means of their dimensions in a radial direction. That is, uniformly distributed vanes of equal axial width will ensure that the outer cap member 20 is co-axial with the inner cap member 10. The vanes may also control the relative positions of the cap members in an axial direction.

During installation, the cap 100 is first placed in the position shown in FIG. 3, with the tail end (or alternatively the head end) of a fastener enclosed within the air cavity 12. The nozzle 200 of a sealing material injector gun is then inserted into the opening 22 to create a temporary seal therebetween. The pre-mixed sealing material 210 is then injected from the nozzle 200 into the reservoir 32, where it collects. When the reservoir 32 is full it overflows, causing an evenly distributed flow of sealing material 210 into the interfay volume 36. The flow of sealing material 210 is initially blocked by the flow restriction region 39, but only until the interfay volume 36 is completely filled. Once the interfay volume 36 is filled the pressure of the sealing material 210 increases to a level at which it is forced through the flow restriction region 39 and into the annular sealing volume 34. The sealing material 210 completely fills the annular sealing volume 34 until it flows out and into contact with the structure 50, at which point the flow of sealing material 210 from the nozzle 200 is stopped.

After injection of curable sealing material 210 into the sealing volume 30 the nozzle 200 is removed and the injected sealing material 210 is left to cure. On curing, it provides a strong adhesive bond between the cap 100 and structure 50, and also between the inner and outer cap members 10, 20. When the sealing material is an epoxy based adhesive as discussed above, it may cure to handling strength (i.e. a degree suitable to provide sufficient strength to withstand knocks or similar from assembly workers) within an hour or so. This compares to handling strength cure times of 12 hours or more for polysulphide or manganese dioxide based sealants.

The cured injected sealing material 210 also serves to fully seal the air cavity 12. Thus, trapped air within the air cavity 12 can provide a safe environment within which sparking and out-gassing events caused during a lightning strike can be contained. Ingress of fuel, water or other contaminants into the air cavity 12 is also prevented.

The sealing material injection method of the present invention avoids the accumulation of air pockets (i.e. entrapment of air) within the sealing volume 30, since a uniformly distributed coverage of sealing material is achieved. Such air pockets are particularly undesirable because they may provide sites for uncontrolled sparking or out-gassing events and also cause the seal to be compromised and a consequent leakage of fuel through the fastener joint. In extreme cases such uncontrolled sparking or out-gassing events could even cause fuel ignition.

Figure 4:
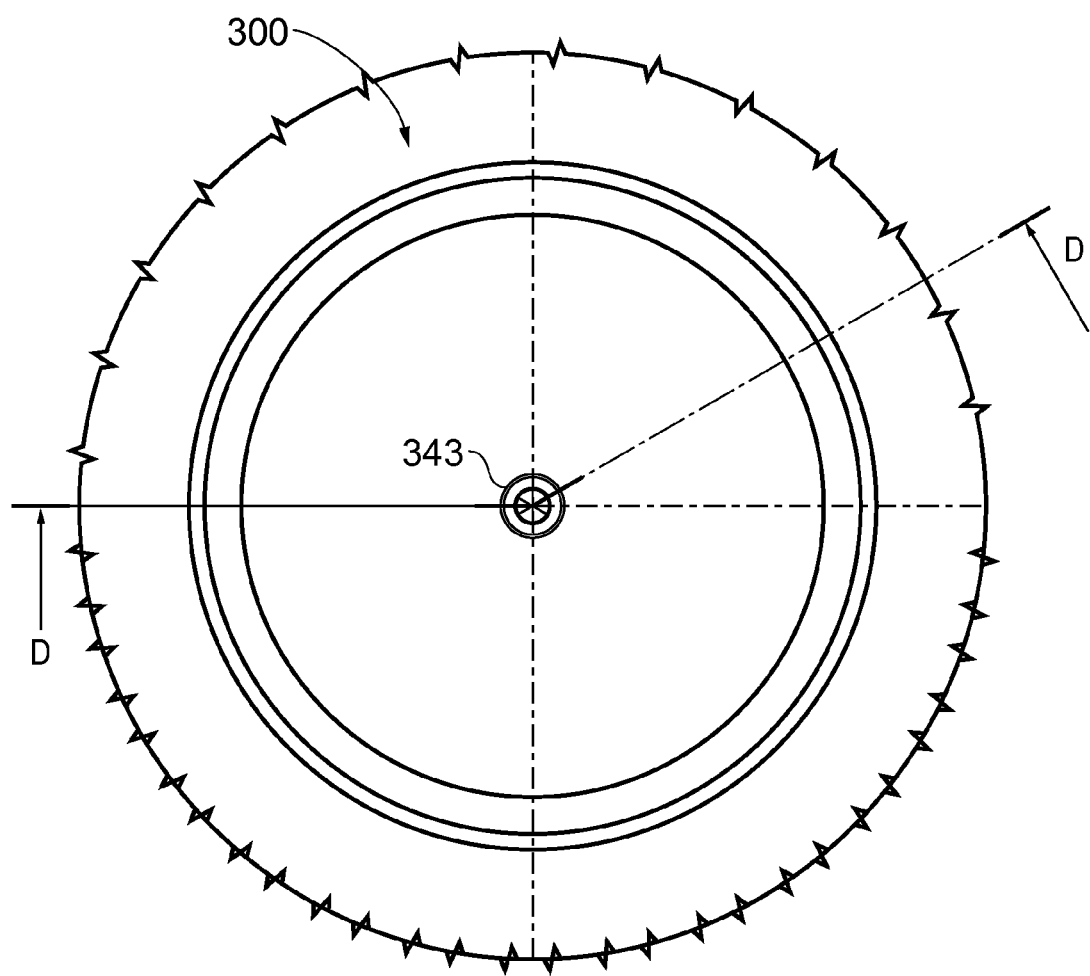
FIG. 4 is a plan view of a nut cap according to a third embodiment of the invention in an installed state.
Figure 5:
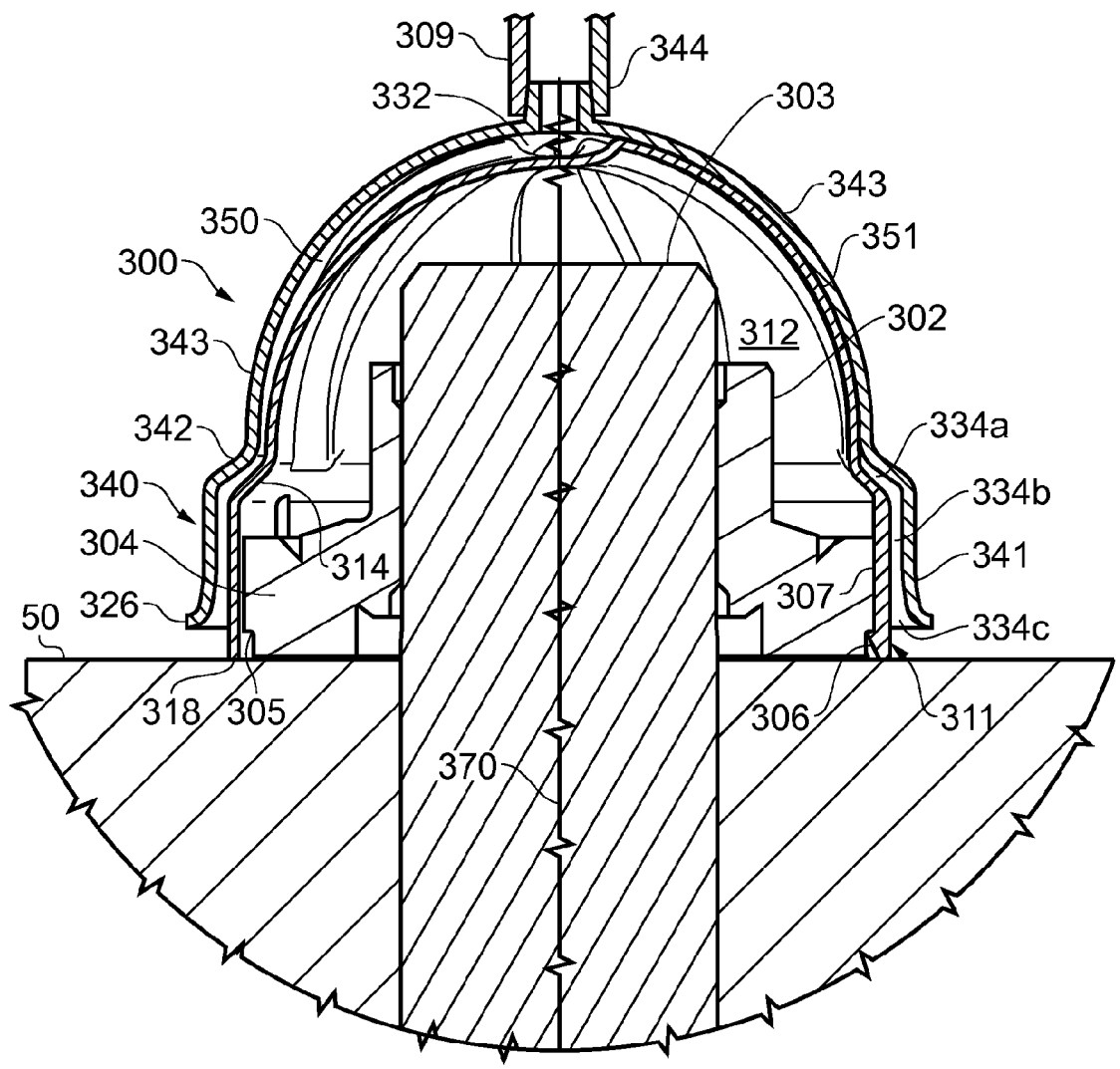
FIG. 5 is a section view taken along a line D-D in FIG. 4.

FIGS. 4 and 5 show an injectable nut cap 300 according to a third embodiment of the present invention. Equivalent features from the previous embodiments are identified by the same reference numerals.

The nut cap includes an inner cap member 310 and an outer cap member 320 shown in FIGS. 6-13. The inner cap member 310 is a generally thin-walled dome-shaped member, with a correspondingly dome-shaped inner air cavity 312 which encloses the tail end of a fastener as shown in FIG. 5.

Referring to FIG. 5, the inner cap member 310 is generally made up of a base 311 and a domed portion 310. The base 311 has a cylindrical portion 313 and a shoulder 314. The shoulder 314 joins the cylindrical portion 313 to the smaller diameter domed portion 310 which extends from the base 311 to an apex 317. In the installed state of FIG. 5, the exposed inboard edge 318 of the cylindrical portion 313 abuts the structural element 50 to fully encapsulate the tail end of the fastener within the air cavity 312. The fastener comprises a nut 302 screwed onto a bolt 304, and a washer 304. The cylindrical portion 313 of the base 311 has mechanical locking features for providing a mechanical connection between the inner cap member 310 and the fastener. In this example, the washer 304 incorporates an overhang portion 305 which interconnects with three snap-fit projections 306 protruding from the inner surface of the cylindrical portion 313. These projections 306 prevent the cap from being forced away from the structure 50 by the pressure of the sealant material as it is injected. The inner cap member also has three axially extending ribs 307 which grip the sides of the washer 304 as shown in FIG. 5.

Figure 10:
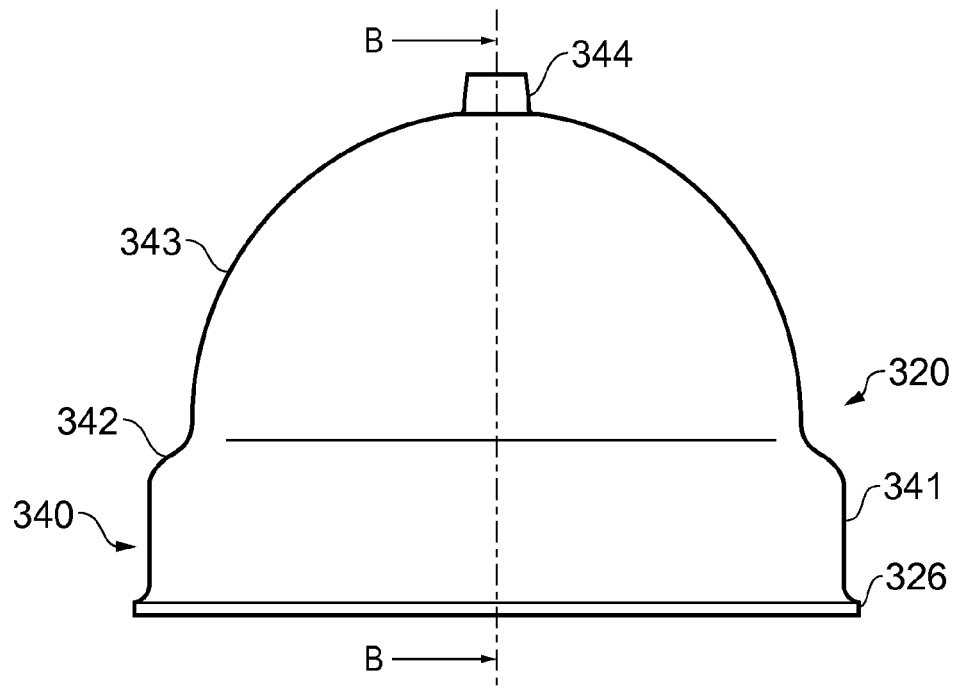
FIG. 10 is a side view of an outer cap member of the nut cap of FIG. 4.
Figure 11:
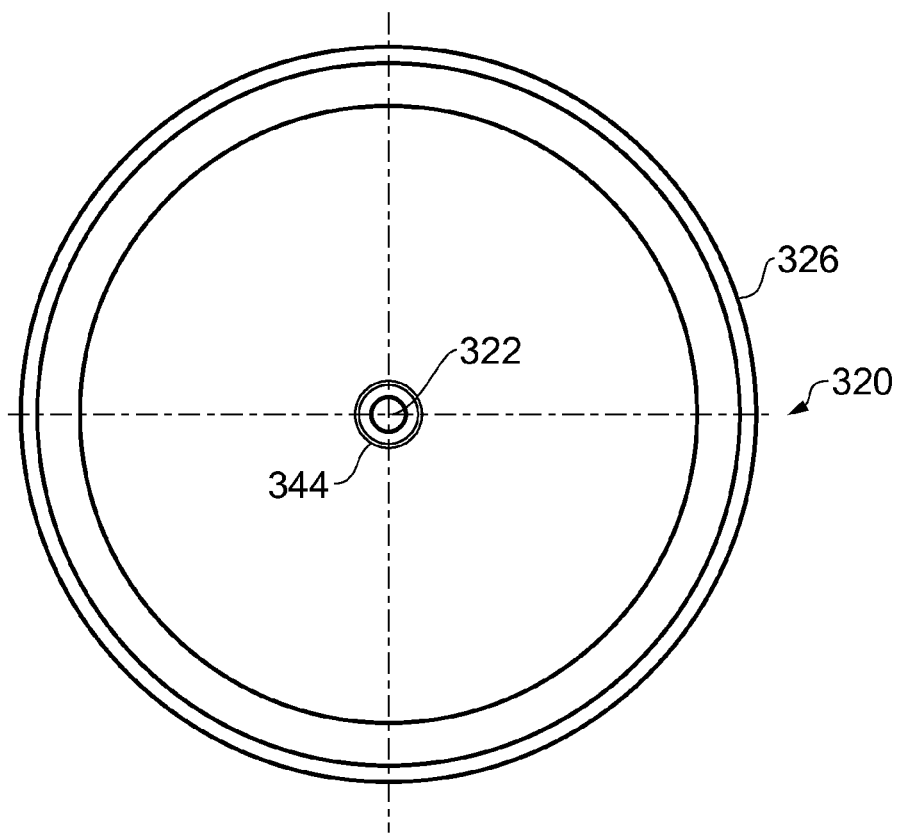
FIG. 11 is a plan view of the outer cap member of FIG. 10.
Figure 12:
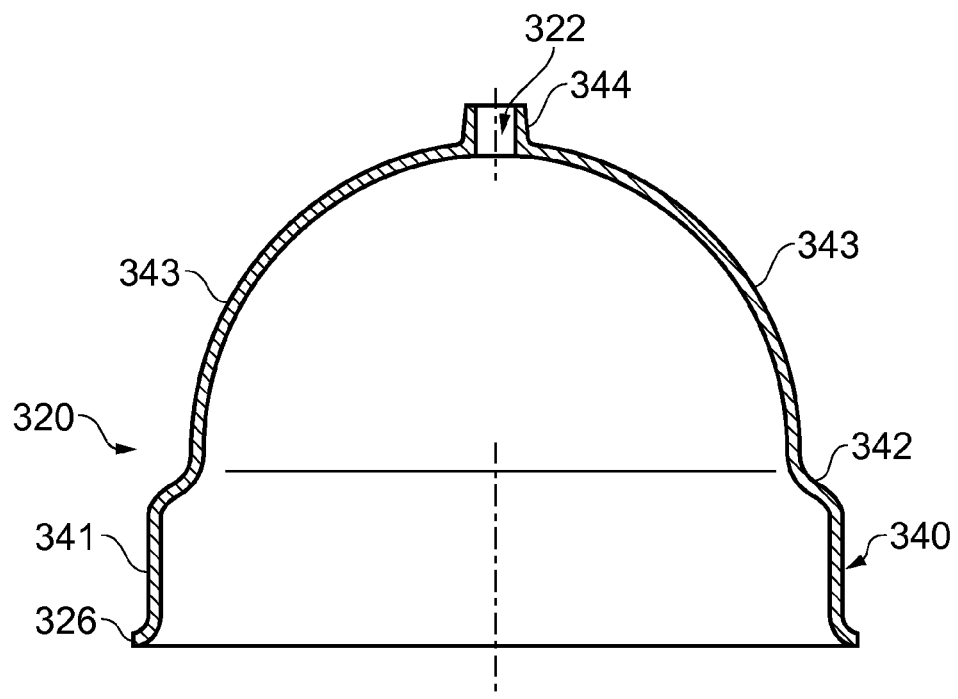
FIG. 12 is a section view taken along a line B-B in FIG. 10.
Figure 13:
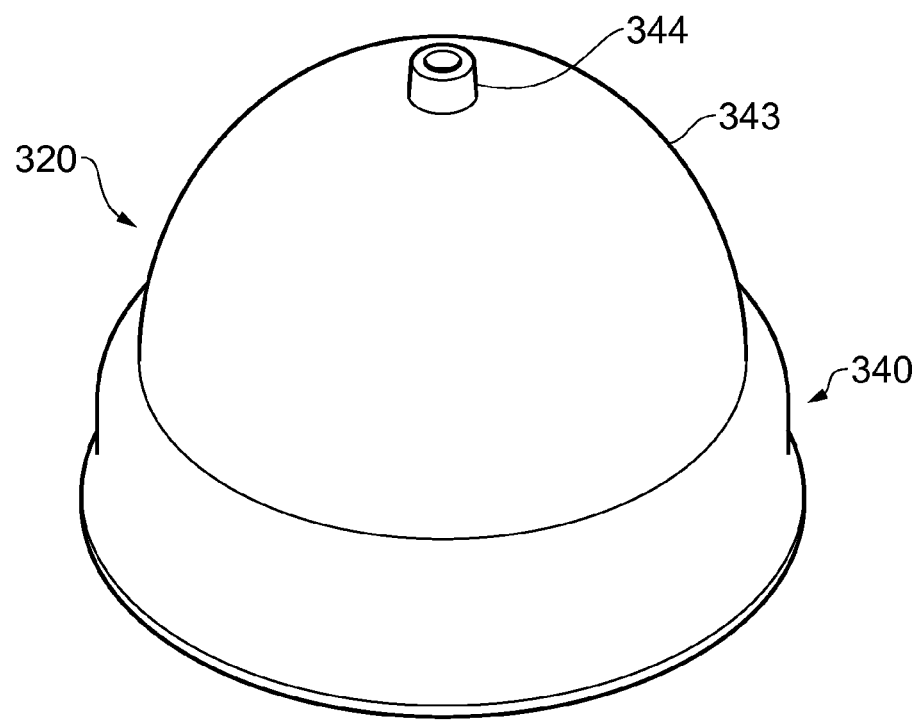
FIG. 13 is an isometric view of the outer cap member of FIG. 10, viewed from above and one side.

Referring to FIG. 10, the outer cap member 320 is also a generally thin-walled dome shaped member, and is shaped to fit over the inner cap member 310. The outer cap member 320 is generally made up of an annular skirt 340 and a smaller diameter domed outboard portion 343. The annular skirt 340 has a cylindrical portion 341, a shoulder 342 joining the cylindrical portion 341 to the domed outboard portion 343, and a flared lip 326 at its free edge. A tapered boss 344 at the apex of the domed outboard portion 343 contains an opening 322. The outer diameter of the boss 344 is sized to be received within the nozzle of a sealing material injector gun 309 as shown in FIG. 5. Fitting the nozzle over the boss 344 is preferred (rather than vice versa) since it does not restrict the flow of sealant material and results in a less directional flow of sealant into the cap. Optionally the nozzle may interconnect with the boss via a bayonet fitting or similar.

The inner cap member has side walls with a substantially uniform wall thickness. The side walls are corrugated to form six outward-facing ridges 351 and channels 350 in an outer surface of the inner cap member and the same number of corresponding inward-facing ridges 352 and channels 353 in an inner surface of the inner cap member. The ridges 351 abut the inner surface of the domed portion 343 of the outer cap member as shown in FIG. 5 so that the sealing material cannot flow between the channels 350. Optionally the ridges 351 can be attached to the inner surface of the outer cap member 320 by ultrasonic welding.

The sealing volume between the inner and outer cap members 310, 320 has three key regions: a reservoir 332; an annular sealing volume (or pocket) 334a-c between the skirt 340 and the base 311; and the channels 350 which interconnect the reservoir 332 and the annular sealing volume 334a-c (rather than a single continuous annular interfay volume as in the previous embodiment).

The reservoir 332 is directly below the opening 322 so that it receives sealing material directly therefrom. The reservoir 332 serves to improve the flow of sealing material into the sealing volume 334a-c by providing a relatively low flow resistance, and also serves to provide an even, uniform flow into the channels 350. Once cured, the sealing material within the channels 350 serves to bond the inner cap member 310 and outer cap member 320 together, and adds structural rigidity to the cap 300.

The annular sealing volume has three parts shown in FIG. 5: an upper part 334a between the shoulders 314, 342; a cylindrical part 334b between the cylindrical portions 341, 313; and a lower part 334c between the base 311 and the lip 326.

The shoulder 342 extends radially outwardly away from a central axis 370 of the cap at a large acute angle, which is larger than the acute angle of the shoulder 314. Therefore the inner surface of the shoulder 342 extends radially away from the outer surface of the shoulder 314 at a small acute angle so that the upper part 334a of the annular sealing volume 334 has a flared shape with a cross-sectional area which increases with distance from the opening 322. The lower part 334c of the annular sealing volume also has a flared shape due to the flared lip 326 such that its cross-sectional area increases with distance from the opening 322. The annular sealing volume 334a-c is open at its lower face such that the sealing material can flow outwardly from the annular sealing volume and into contact with the structural element 50. The lip 326 is axially offset from the base edge 318 of the inner cap member 310.

Figure 6:
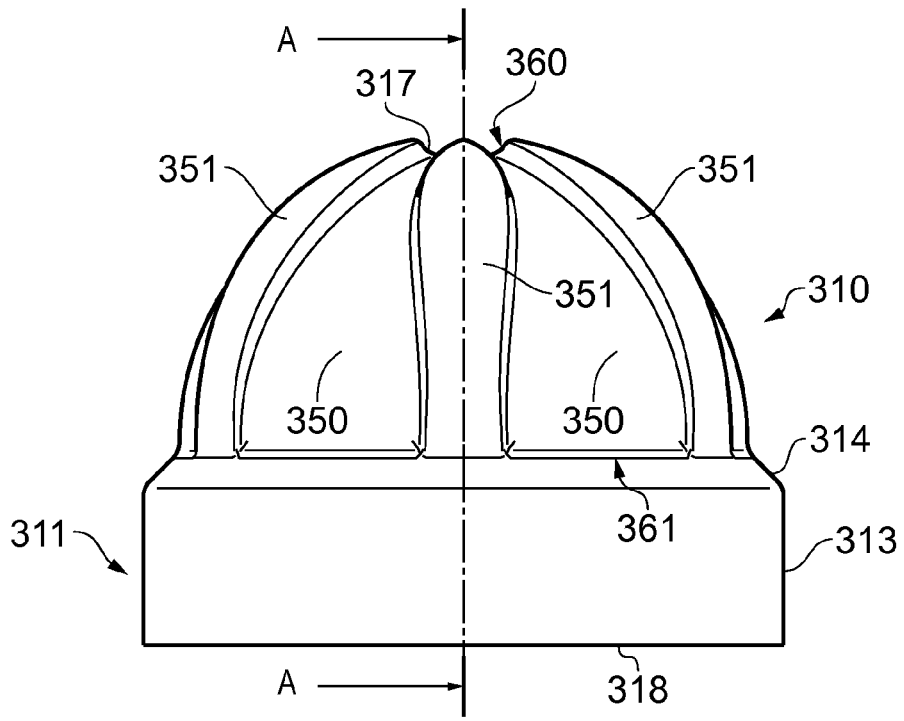
FIG. 6 is a side view of an inner cap member of the nut cap of FIG. 4.
Figure 7:
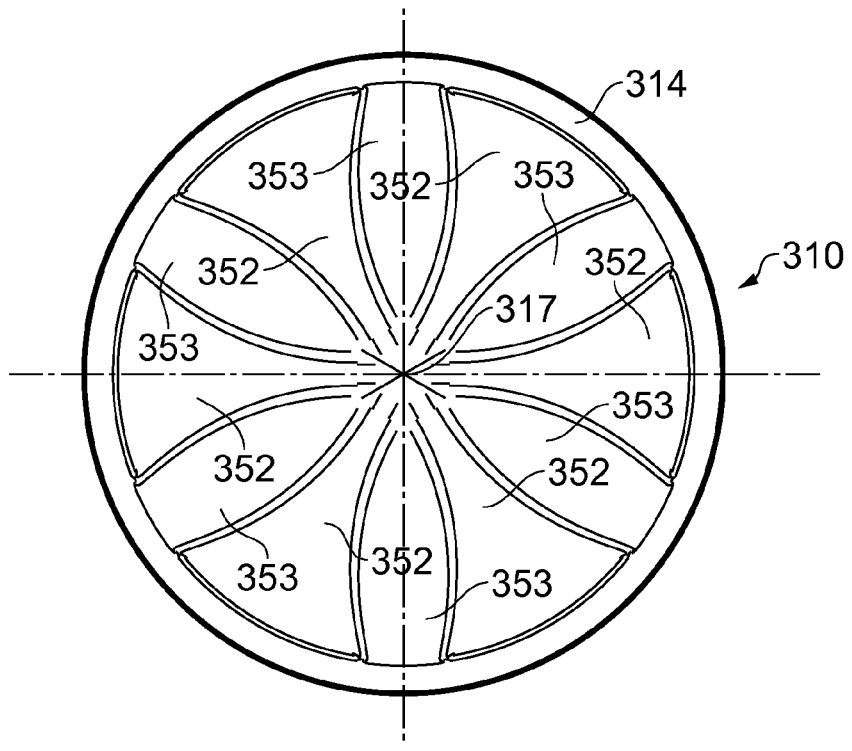
FIG. 7 is a plan view of the inner cap member of FIG. 6.
Figure 8:
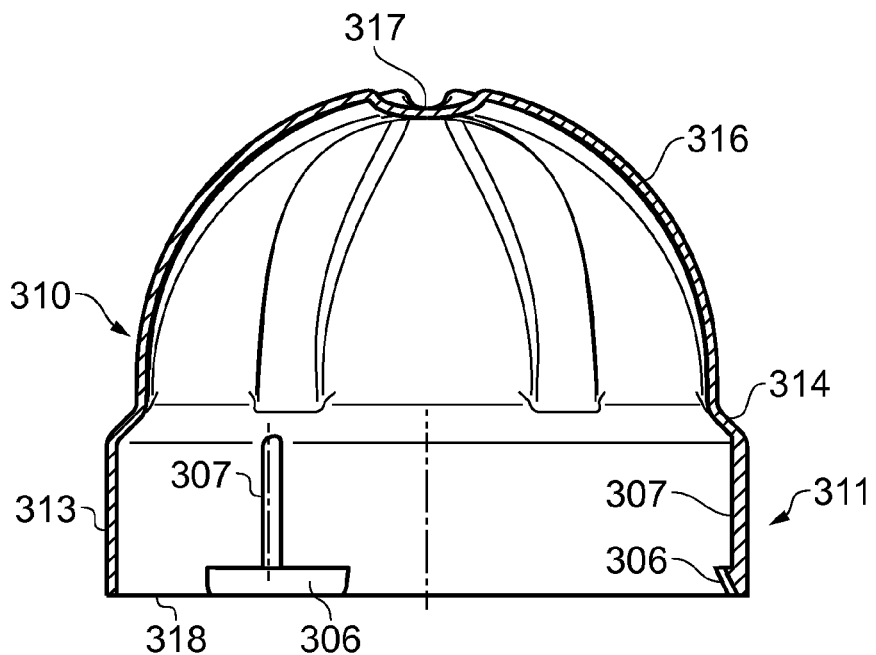
FIG. 8 is a section view taken along a line A-A in FIG. 6.
Figure 9:
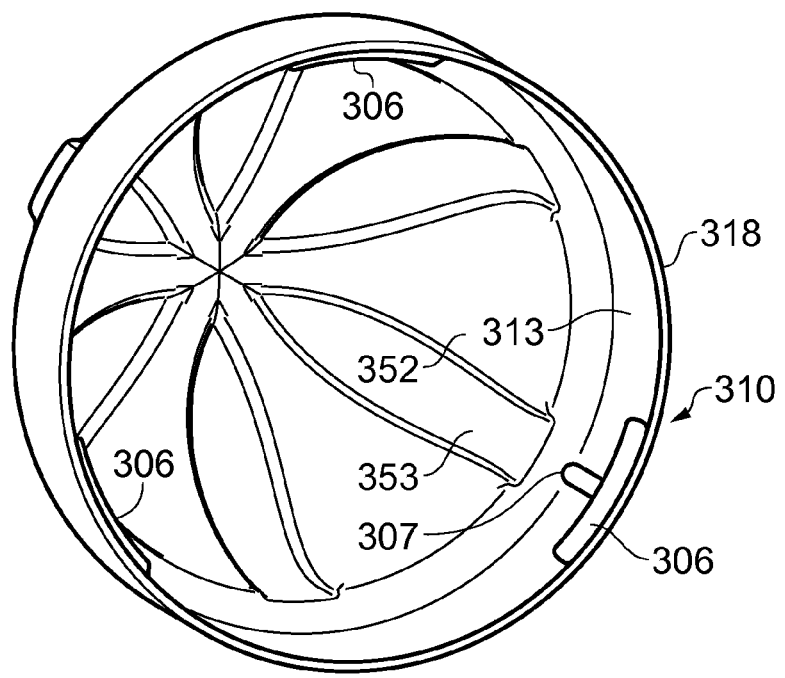
FIG. 9 is an isometric view of the inner cap member of FIG. 6, viewed from below and one side.

Referring to FIG. 6, each channel 350 has an inlet 360 arranged to receive the flow of curable sealing material from the sealing material inlet and an outlet 361 arranged to feed the flow of curable sealing material into the upper part of the annular sealing volume 334a. The channels 350 terminate at the shoulder 314 so that their outlets 361 are set back in an axial direction from the edge 318 of the base 311.

The advantage of replacing the continuous interfay region 36 of the previous embodiment with a series of channels 350 is that they present less resistance to flow so the sealing material can flow more freely from the reservoir into the annular sealing volume. This can be appreciated by comparing the surface area per unit volume of the two arrangements—the thin continuous interfay volume 36 of the previous embodiment having a higher surface area per unit volume and hence higher resistance than the channels 350.

As can be seen on the left-hand side of FIG. 5, the depth of each channel 350 gradually reduces in the direction of flow. As can be seen in FIG. 6, the circumferential width of each channel 350 also increases as it extends towards the annular sealing volume in the direction of flow. This encourages the streams of sealing material from the channels to merge as they exit the channels 350 and enter the annular sealing volume 334a-c.

FIGS. 14-17 show a kit of parts for forming an injectable nut cap according to a fourth embodiment of the present invention. The kit comprises an inner cap member 410 and an outer cap member 420. The inner cap member 410 is generally made up of a cylindrical base portion 413, and a domed portion 416 which extends from the base portion 413 to a planar apex 417.

The outer cap member 420 is also a generally thin-walled dome shaped member, and is shaped to fit over the inner cap member 410. The outer cap member 420 is generally made up of an annular flange 440, a cylindrical base 441, and a domed outboard portion 442. The domed outboard portion 442 contains an opening 422 sized to interconnect with the nozzle of a sealing material injector gun (not shown).

The inner cap member has side walls with a substantially uniform wall thickness. A plurality of outward-facing ridges 451 and channels 450 are formed in an outer surface of the inner cap member and the same number of corresponding inward-facing ridges 452 and channels 453 are formed in an inner surface of the inner cap member. The ridges 451 abut the inner surface of the outer cap member 420 when the cap is assembled so that the sealing material cannot flow between the channels. Optionally the ridges 451 can be attached to the inner surface of the outer cap member 420 by ultrasonic welding.

Figure 14:
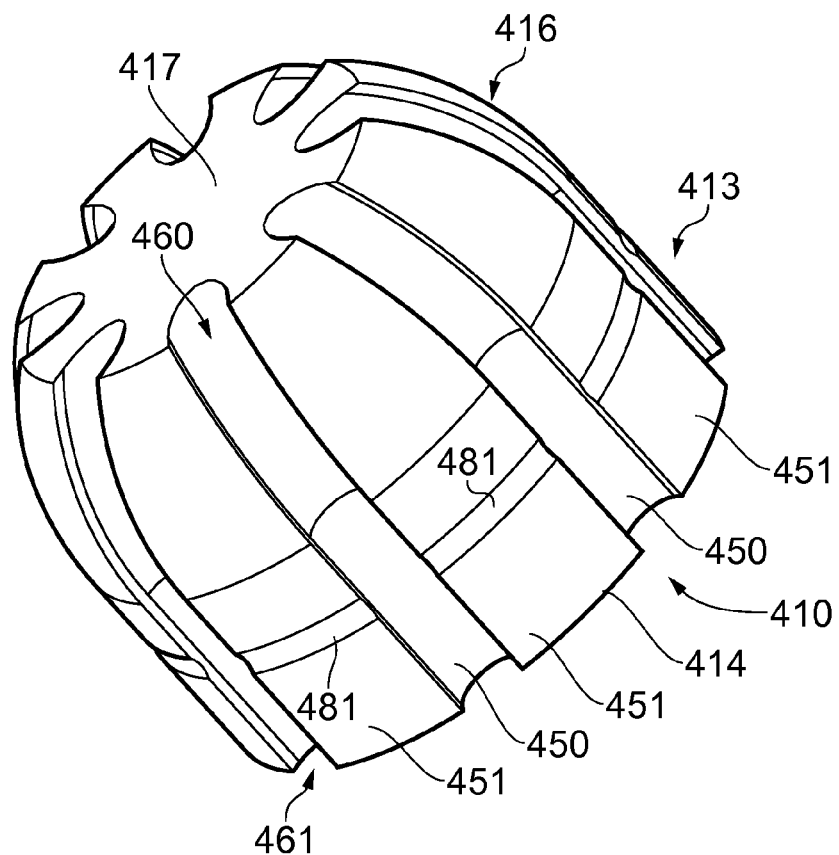
FIG. 14 is an isometric view of an inner cap member of a nut cap according to a fourth embodiment of the invention.
Figure 15:
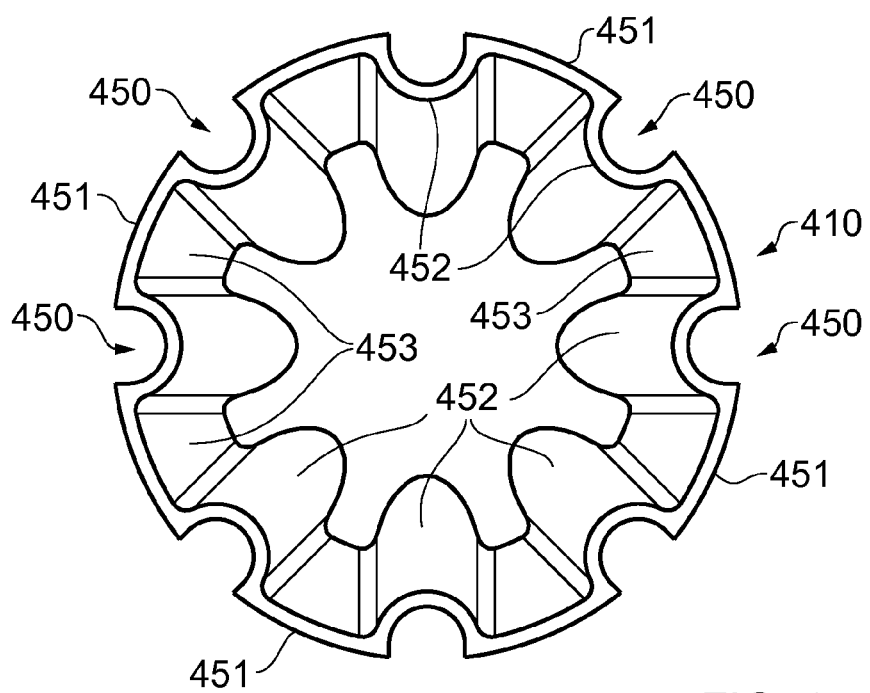
FIG. 15 is an under side view of the inner cap member of FIG. 14.
Figure 16:
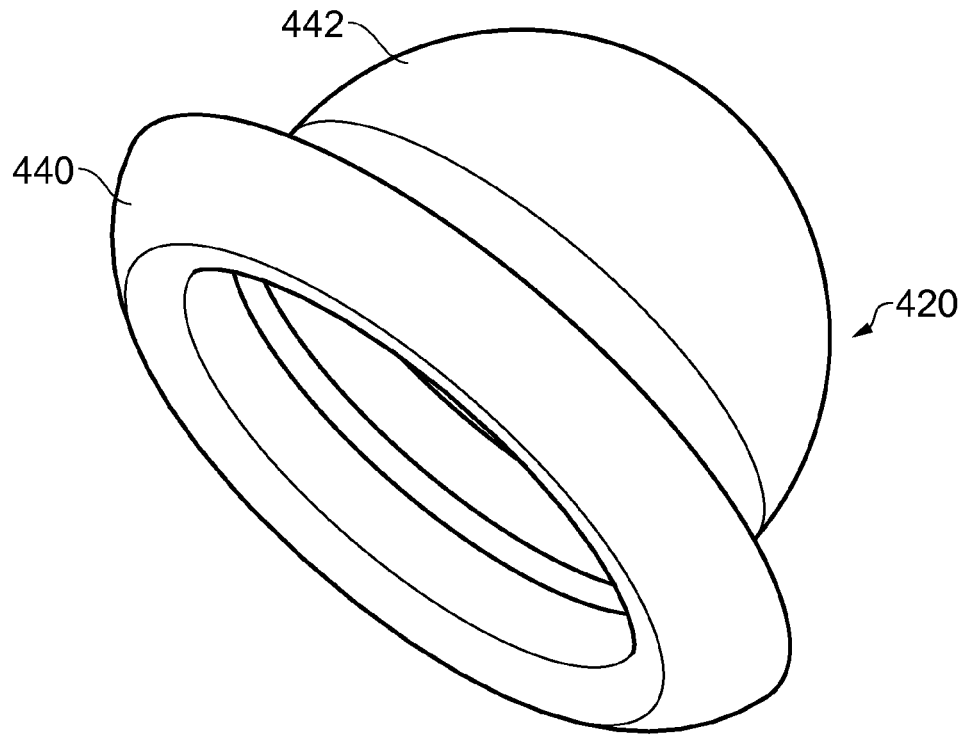
FIG. 16 is an isometric view of an outer cap member of the nut cap according to the fourth embodiment of the invention.
Figure 17:
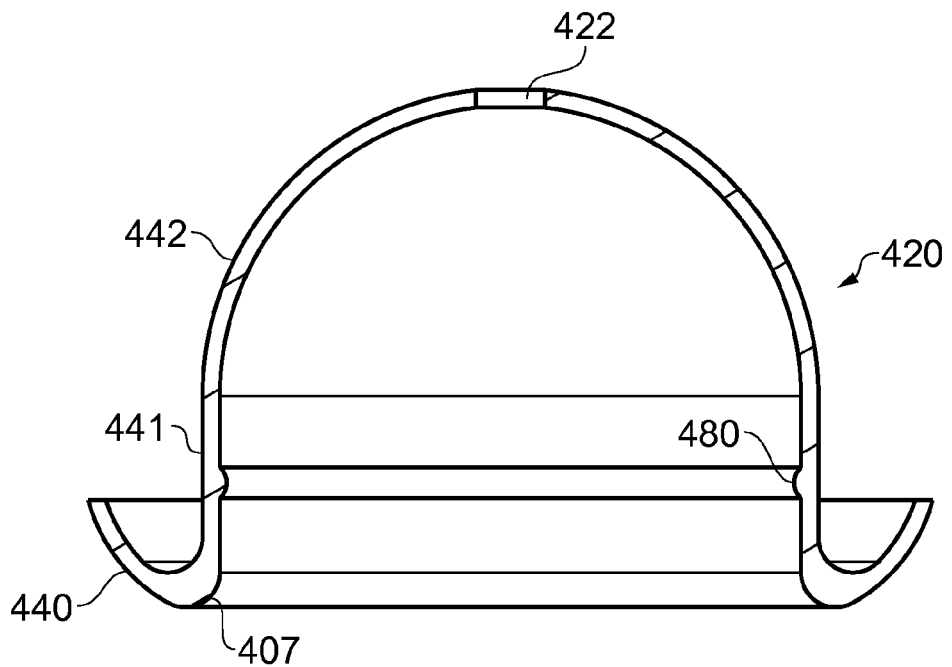
FIG. 17 is a section view of the outer cap member of FIG. 16.
Figure 18:
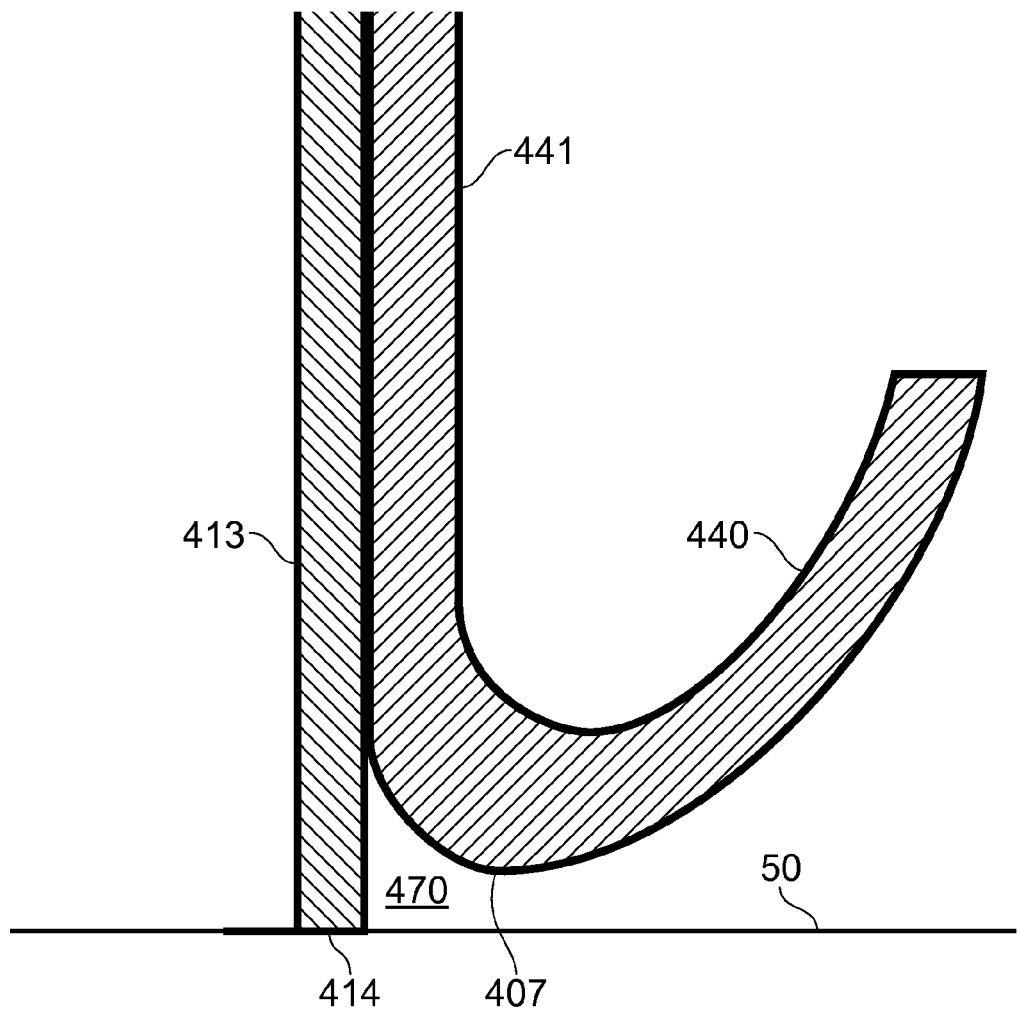
FIG. 18 is an enlarged section view of part of the nut cap according to the fourth embodiment of the invention in an installed state where it meets a structure.

When assembled as shown in FIG. 18, a small annular sealing volume (or pocket) 470 is formed between a curved radius 407 of the annular flange 440 and the base 413 of the inner cap member. Referring to FIG. 14, each channel 450 has an inlet 460 arranged to receive the flow of curable sealing material from the sealing material inlet and an outlet 461 arranged to feed the flow of curable sealing material into the annular sealing volume 470. Unlike the previous embodiment, the channels 450 terminate at the edge 414 of the base 413. The channels 450 have an approximately semi-circular sectional shape which presents a low resistance to flow. The depth and width of each channel 450 remains substantially constant along its length.

The inner surface of the base 441 of the outer cap member is formed with an annular projection 480 which is received as a snap fit in a corresponding recess 481 in the outer surface of the inner cap member in order to secure the cap members together before the sealant cures.

In the third and fourth embodiments of the invention discussed above the ridges and channels are formed in the inner cap member, and the outer cap member has a smooth outer surface. This is preferred since the smooth outer surface of the outer cap member does not attract dirt and has a profile with less impact on the flow of water or liquid over the cap. However in an alternative embodiment (not shown) the outer cap member instead of the inner cap member may be corrugated to form the ridges and channels.

Although the invention has been described above with reference to one or more preferred embodiments, it will be appreciated that various changes or modifications may be made without departing from the scope of the invention as defined in the appended claims.

The invention claimed is:

1. A cap for forming a sealed cavity around one end of a fastener, the cap comprising:
   an inner cap member having an annular base terminating at an edge which surrounds an opening into an air cavity for enclosing the one end of a fastener;
   an outer cap member having an annular skirt or flange, the annular skirt or flange and annular base between them defining an annular sealing cavity; and
   a sealing material inlet comprising an opening in the outer cap member that is in fluid communication with the annular sealing cavity, the opening being arranged to interconnect with a sealing material injection device to provide a flow of curable sealing material from the sealing material inlet into the annular sealing cavity.

2. A cap according to claim 1, comprising an interfay cavity in fluid communication with the opening of the sealing material inlet and the annular sealing cavity.

3. A cap according to claim 2, wherein the interfay cavity comprises a flow restriction feature arranged to restrict flow of curable sealing material from the opening to the annular sealing cavity.

4. A cap according to claim 2, wherein the interfay cavity includes a sealant reservoir arranged to receive curable sealing material from the opening and distribute it to the annular sealing cavity.

5. A cap according to claim 2, wherein the interfay cavity has an annular cross-sectional shape.

6. A cap according to claim 1, wherein the opening of the sealing material inlet is centred on a central axis of the outer cap member.

7. A cap according to claim 1, further comprising a plurality of channels formed in either an outer surface of the inner cap member or an inner surface of the outer cap member, each channel being in fluid communication with the opening of the sealing material inlet and the annular sealing cavity.

8. A cap according to claim 7 wherein either: the channels are formed in the outer surface of the inner cap member and are separated by channels which abut the inner surface of the outer cap member; or the channels are formed in the inner surface of the outer cap member and separated by ridges which abut the outer surface of the outer cap member.

9. A cap according to claim 7 wherein each channel has an inlet arranged to receive the flow of curable sealing material from the sealing material inlet and an outlet arranged to feed the flow of curable sealing material into the annular sealing cavity, wherein the outlets of the channels are set back in an axial direction from the edge of the annular base of the inner cap member.

10. A cap according to claim 7, wherein each channel has a width which increases as it extends towards the annular sealing cavity.

11. A cap according to claim 7, wherein each channel has a depth which decreases as it extends towards the annular sealing cavity.

12. A cap according to claim 7, wherein either: the channels are formed in an outer surface of the inner cap member and a plurality of corresponding channels are formed in an inner surface of the inner cap member; or the channels are formed in an inner surface of the outer cap member and a corresponding plurality of channels are formed in an outer surface of the outer cap member.

13. A cap according to claim 12, wherein either: the inner cap member has side walls with a substantially uniform wall thickness, the channels are formed in an outer surface of the inner cap member and a plurality of corresponding channels are formed in an inner surface of the inner cap member; or the outer cap member has side walls with a substantially uniform wall thickness, the channels are formed in an inner surface of the outer cap member and a corresponding plurality of channels are formed in an outer surface of the outer cap member.

14. A cap according to claim 1, wherein the inner cap member comprises a substantially dome-shaped portion extending from the annular base, and the outer cap member comprises a corresponding substantially dome-shaped portion extending from the annular skirt or flange.

15. A cap according to claim 1, wherein the annular skirt or flange of the outer cap member terminates at an edge, the edge of the annular skirt or flange being offset in an axial direction from the edge of the annular base of the inner cap member.

16. A cap according to claim 1, wherein the inner cap member and outer cap member are formed as separate parts.

17. A cap according to claim 1, wherein the sealing material inlet comprises a projection in the outer cap member, the projection containing the opening and being arranged to interconnect with the sealing material injection device.

18. A cap according to claim 1, further comprising a plurality of vanes between the inner face of the outer cap member and the outer face of the inner cap member.

19. A joint comprising:
   a structure;
   a fastener passing through the structure;
   a cap according to claim 1, wherein the air cavity of the inner cap member encloses an end of the fastener and the edge of the inner cap member abuts the structure; and sealing material filling the annular sealing cavity of the cap and contacting the structure to seal the air cavity.

20. A joint according to claim 19, wherein the structure is a structural component of an aircraft.

21. A joint according to claim 19, wherein the sealing material comprises an epoxy based adhesive.

22. A kit of parts for forming a sealed cavity around one end of a fastener, the kit including:
- a cap comprising:
  - an inner cap member having an annular base terminating at an edge which surrounds an opening into an air cavity for enclosing the one end of a fastener;
  - an outer cap member having an annular skirt or flange which extends radially outwardly away from the annular base, the annular skirt or flange and annular base between them defining an annular sealing cavity; and
  - a sealing material inlet in fluid communication with the annular sealing cavity; and
- a sealing material injection device having a nozzle arranged to interconnect with the sealing material inlet of the cap to direct a flow of curable sealing material into the annular sealing cavity.

23. A kit of parts according to claim 22, wherein the curable sealing material comprises an epoxy based adhesive.

24. A method of installing a cap to form a sealed cavity around one end of a fastener passing through a structure, the cap comprising: an inner cap member having an annular base terminating at an edge which surrounds an opening into an air cavity for enclosing the one end of a fastener; an outer cap member having an annular skirt or flange which extends radially outwardly away from the annular base, the annular skirt or flange and annular base between them defining an annular sealing cavity; and a sealing material inlet comprising an opening in the outer cap member that is in fluid communication with the annular sealing cavity, the method including:
- installing the cap over the one end of the fastener so that it is enclosed within the air cavity of the inner cap member and the edge of the annular base abuts the structure;
- injecting curable sealing material into the annular sealing cavity via the sealing material inlet so that the curable sealing material contacts the structure; and
- curing the curable sealing material to seal the air cavity.

25. A method according to claim 24, wherein the structure comprises a structural component of an aircraft.

26. A method according to claim 24, wherein the curable sealing material comprises an epoxy based adhesive.

* * * * *